United States Patent
Desai

(10) Patent No.: US 10,592,351 B1
(45) Date of Patent: Mar. 17, 2020

(54) DATA RESTORE PROCESS USING A PROBABILITY DISTRIBUTION MODEL FOR EFFICIENT CACHING OF DATA

(71) Applicant: EMC IP Holding Company LLC, Hopkinton, MA (US)

(72) Inventor: Keyur Desai, Cary, NC (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 0 days.

(21) Appl. No.: 16/161,630

(22) Filed: Oct. 16, 2018

(51) Int. Cl.
| | | |
|---|---|---|
| G06F 11/14 | (2006.01) | |
| G06F 12/0871 | (2016.01) | |
| G06F 12/0868 | (2016.01) | |
| G06F 17/18 | (2006.01) | |
| G06N 20/00 | (2019.01) | |

(52) U.S. Cl.
CPC ...... *G06F 11/1464* (2013.01); *G06F 11/1451* (2013.01); *G06F 11/1466* (2013.01); *G06F 11/1469* (2013.01); *G06F 12/0868* (2013.01); *G06F 12/0871* (2013.01); *G06F 17/18* (2013.01); *G06N 20/00* (2019.01); *G06F 11/1456* (2013.01)

(58) Field of Classification Search
None
See application file for complete search history.

(56) References Cited

U.S. PATENT DOCUMENTS

| | | | |
|---|---|---|---|
| 2002/0102030 A1* | 8/2002 | Kambegawa | G06T 9/005 382/247 |
| 2010/0241796 A1* | 9/2010 | Seol | G11C 16/3418 711/103 |
| 2015/0012797 A1* | 1/2015 | Leggette | H04L 67/10 714/763 |

* cited by examiner

*Primary Examiner* — Brian R Peugh
(74) *Attorney, Agent, or Firm* — Dergosits & Noah LLP; Todd A. Noah

(57) ABSTRACT

Described is a system (and method) that may implement a more intelligent mechanism for managing caching data as part of a data restore process. The system may utilize a read-ahead cache that leverages a statistical probability. More specifically, the system may model a data restore pattern using a binomial probability distribution to dynamically enable when data is stored to read-ahead cache. Accordingly, the system may enable/disable a read-ahead cache setting at any point during the restore process by dynamically adjusting a sequential read threshold according to a determined statistical probability. For example, the system may determine such a dynamical setting based on a Binomial Probability Density Function (PDF) and/or a Cumulative Distribution Function (CDF) to calculate real-time thresholds.

22 Claims, 4 Drawing Sheets

DATA RESTORE PROCESS USING A PROBABILITY DISTRIBUTION MODEL FOR EFFICIENT CACHING OF DATA

TECHNICAL FIELD

This disclosure relates to a system that provides a restore mechanism, and more particularly, a restore mechanism that uses a probability distribution model for managing a data cache for data reads.

BACKGROUND

A data storage system may provide various backup and recovery tools that are crucial for enterprise level network clients. Customers may rely on backup systems to efficiently backup and recover data in the event of user error, data loss, system outages, hardware failure, or other catastrophic events to allow business applications to remain in service or quickly come back up to service after a failure condition or an outage. When a backup system restores data, in order to improve performance, data is often read ahead using a cache. However, a read ahead technique may not always be optimal in various scenarios. For example, data to be restored may not always be stored in a sequential manner, and instead, may be stored in a random manner. In such scenarios, reading ahead may be unnecessary and hinder performance. Moreover, data stored using a service may require fees based on the amount of data accessed, and accordingly, inefficiently accessing data may incur unnecessary costs. Accordingly, there is a continued need to improve techniques for managing a data cache.

BRIEF DESCRIPTION OF THE DRAWINGS

The accompanying drawings, which are incorporated into and constitute a part of this specification, illustrate embodiments of the disclosure and together with the description, serve to explain the principles of the disclosure.

DETAILED DESCRIPTION

Figure 1:
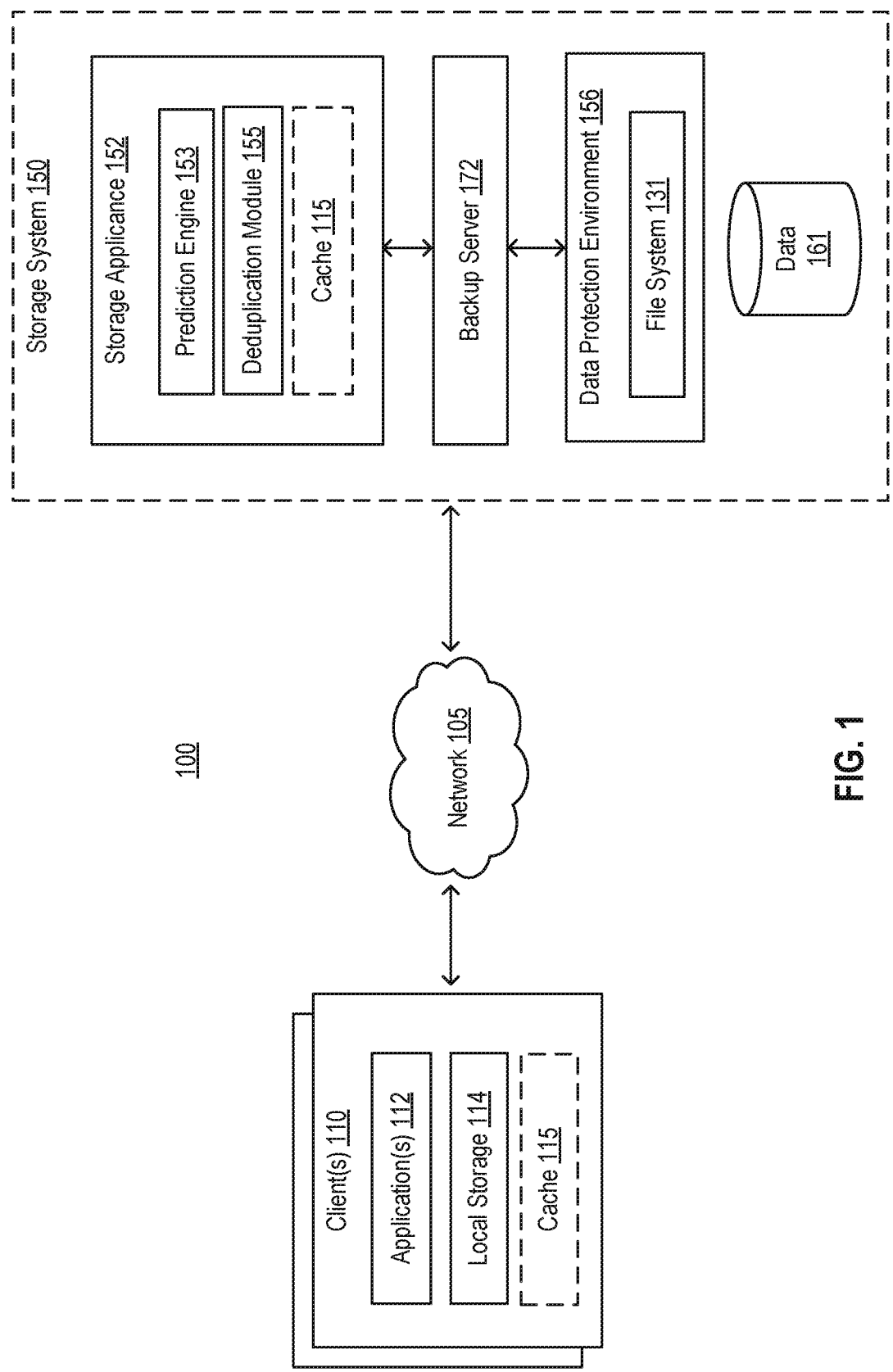
FIG. 1 is a block diagram illustrating an example of an operating environment for managing a data cache during a restore process according to one or more embodiments of the disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosure. Although these embodiments are described in sufficient detail to enable one skilled in the art to practice the disclosed embodiments, it is understood that these examples are not limiting, such that other embodiments may be used and changes may be made without departing from their spirit and scope. For example, the operations of methods shown and described herein are not necessarily performed in the order indicated and may be performed in parallel. It should also be understood that the methods may include more or fewer operations than are indicated. In some embodiments, operations described herein as separate operations may be combined. Conversely, what may be described herein as a single operation may be implemented in multiple operations.

Reference in the specification to "one embodiment" or "an embodiment" or "some embodiments," means that a particular feature, structure, or characteristic described in conjunction with the embodiment can be included in at least one embodiment of the disclosure. The appearances of the phrase "embodiment" in various places in the specification do not necessarily all refer to the same embodiment.

Overview

In some embodiments, described is a system (and method) that provides an intelligent mechanism for enabling a read-ahead cache. The mechanism leverages a binomial probability distribution to determine when a read-ahead cache should be enabled to improve the efficiency of a data restore process.

In general, when performing a data restore process, data is often read ahead of time and stored into a cache to improve performance. Accordingly, the system may perform some heuristic to predict which data is likely required for a data restore process, and store such data in a cache. For example, during a data restore process, if a current read request is for a 32 Kilobyte (KB) block at a particular offset, the system (e.g. backup applications) may often read ahead an additional 8×32 KB=256 Megabytes (MB) of data that is stored in a cache. As described, although such a read ahead semantic may improve performance, a restore workload may not always include sequential reads (e.g. read byte of data in sequential order), and instead, require random (e.g. non-sequential) reads of data. Accordingly, a data restore application may often switch between sequential and non-sequential (e.g. random) reads. As a result, a data restore application may implement some form of Access Pattern Detection (APD). For example, the backup application would disable read-ahead caching if a non-sequential access pattern is detected (or predicted), and enable read-ahead caching if a sequential access pattern is detected (or predicted). In some implementations, an APD algorithm sets certain random and sequential I/O thresholds based on historical data reads (or I/Os). However, these random or sequential thresholds are not based on any scientific data modelling and are often selected based on a limited number of empirical data points. For example, if 25 of the last 150 reads are random, a backup application (or administrator) may set a random access threshold to 50%. Accordingly, if 8 of the last 16 reads are random, the application may mark the access pattern as random and read-ahead caching may be disabled.

In some embodiments of the present disclosure, described is a system that implements a more intelligent mechanism for utilizing a read-ahead cache. In some embodiments, the mechanism implements a data restore process based on a statistical probability. For example, a data restore pattern may be modelled using a binomial probability distribution. In addition, the mechanism may dynamically enable when data is stored to read-ahead cache. In one embodiment, the mechanism may enable/disable a read-ahead cache setting at any point during the restore process by dynamically adjusting a sequential read threshold according to a determined statistical probability. For example, such a dynamical setting may be determined based on a Binomial Probability Density Function (PDF) and/or an associated Cumulative Distribution Function (CDF) to calculate real-time thresholds.

Accordingly, the restore mechanism attempts to model a data restore process (or a historical data restore) as a binomial probability distribution using an associated Probability Density Function (PDF), which may provide a probability of a pattern to be sequential or non-sequential at any given point of time. In addition, the restore mechanism may use the Cumulative Distribution Function (CDF) to calculate the probability that a restore pattern takes a value less than or equal to a given sequential or non-sequential threshold. It should be noted that implementations primarily describe the use of a PDF in CDF formulas. However, the restore mechanism may use the same model to leverage various other statistical techniques such as variance, mean, standard deviation, etc.

In addition, the restore mechanism may implement a binomial probability model to machine learning or predictive analysis components to facilitate automatic adjustment of various data restore related parameters. For example, various thresholds may be self-adjusted based on a machine learning model to improve performance of a data restore. For instance, various restore workload related characteristics such as the probability of getting x number of sequential or non-sequential reads in a restore pattern may be predicted by applying such a model on historical data.

Accordingly, in some embodiments, as further described herein is a restore mechanism may leverage a binomial probability model to improve the efficiency of a data restore process.

Example Operating Environment

In some embodiments, the intelligent data restore mechanism may be provided within an operating environment. An example of such an operating environment is further described herein with reference to FIG. 1. However, in general, embodiments of the disclosure may include and/or be implemented in an operating environment including a cloud services environment that may be, or include, a data protection operating environment that includes a storage environment including primary storage and data protection storage. For example, at least some functionality may be provided by, or implemented in connection with, various platforms such as the Dell/EMC Data Domain™ data protection platform, and associated systems, methods, and components, although use of this particular platform is provided only by way of illustration and is not required.

In one embodiment, the storage environment may take the form of a cloud storage environment. However, embodiments of the disclosure may also be implemented for an on-premises storage environment, and hybrid storage environments that include public and private elements, as well as any other type of storage environment. In addition, any of these cloud environments, or other operating environments, may take the form of an operating environment that is partly, or completely, virtualized. The storage environment may include one or more host devices that each host one or more applications used by a client of the storage environment. As such, a particular client may employ, or otherwise be associated with, one or more instances of each of one or more applications. In general, the applications employed by the clients are not limited to any particular functionality or type of functionality. Some example applications may include database applications (e.g. a SQL Server), filesystems, as well as data stores such as Oracle databases for example. The applications on the clients may generate new and/or modified data that is desired to be protected.

Any of the devices, including the clients, servers and hosts, in the operating environment can take the form of software, physical machines, or virtual machines (VM), or could be implemented as a Function-as-a-Service (FaaS), or any combination thereof, though no particular device implementation or configuration is required for any embodiment. Similarly, data protection system components such as databases, storage servers, storage volumes, storage disks, backup servers, restore servers, backup clients, and restore clients, for example, can likewise take the form of software, physical machines or virtual machines (VM), or could be implemented as a Function-as-a-Service (FaaS), though no particular component implementation is required for any embodiment. Where VMs are employed, a hypervisor or other virtual machine monitor (VMM) can be employed to create and control the VMs.

More specifically, and with reference to FIG. 1, shown is a block diagram illustrating an example of an operating environment 100 for managing a data cache during a restore process according to one or more embodiments of the disclosure. As shown, the operating environment 100 may include a client(s) 110 that may be associated with a customer of a storage service, a storage system 150 that may be associated with a storage service provider, which may interact via a network 105. The network may be any type of wired or wireless network including a local area network (LAN), a wide area network (WAN), or a direct communication link, or other suitable connection.

In one embodiment, storage system 150 may represent one or more components of a Data Domain™ Restorer (DDR)-based deduplication storage system, and storage server 172 may be implemented as a Data Domain deduplication storage server provided by Dell/EMC™ Corporation for use with DDR storage devices. However, other similar backup and storage systems are also possible. Storage system 150 may utilize certain protocol-specific namespaces that are the external interface to applications and include NFS (network file system) and CIFS (common internet file system) namespaces, as well as DD Boost provided by Dell/EMC Corporation. In general, DD Boost (Data Domain Boost) is a system that distributes parts of the deduplication process to the backup server or application clients, enabling client-side deduplication for faster, more efficient backup and recovery. A data storage deployment may use any combination of these interfaces simultaneously to store and access data. Data Domain (DD) devices in system 100 may use the DD Boost backup protocol (e.g. file-oriented access protocol) to provide access from servers to DD devices. The DD Boost library exposes APIs (application programming interfaces) to integrate with a Data Domain system using an optimized transport mechanism. These API interfaces exported by the DD Boost Library provide mechanisms to access or manipulate the functionality of a Data Domain file system. For example, the DD Boost protocol or API may be an example of a file-oriented access interface (or protocol). For instance, the DD Boost protocol may create metadata information related to backup functions (e.g. metadata related to backup type, identifiers, etc.).

Client(s) 110 (or target system) may host one or more applications 112, and may include local storage 114, as well as an interface for communicating with other systems and devices, such as the storage system 150. In general, the applications 112 may create new and/or modified data that is desired to be protected. As such, the client 110 is an example of a host device. A client 110 may take the form of a VM. In general, the VM is a virtualization of underlying hardware and/or software and, as such, the client 110 may include or otherwise be associated with various underlying components. The local storage 114 can be used to locally store data, which may be backed up using the storage system 150. The backup data can be restored to the local storage 114. The client 110 may include a backup client application that cooperates with storage system 150, to create backups of client data, which may include data (or backup data) 161. As used herein, the term "data" is intended to be broad in scope. Accordingly, data may include data objects (or objects) as further described herein, data segments such as may be produced by data stream segmentation processes, data chunks, data blocks, atomic data, emails, files, contacts, directories, sub-directories, volumes, etc.

As further described herein, to improve the performance of a data restore process, data to be restored may be preemptively stored to a cache (or read-ahead cache) 115. As shown, the cache 115 may include a local cache storage of the client. In addition, the cache 115 may include a cache associated with, or part of, the storage system 150. As shown, the cache 115 may be part of a backup appliance 152. It is contemplated, however, the cache 115 (although not shown) may also be part of a backup server 172, or the data protection environment 156. In one embodiment, the cache 115 may be any storage mechanism that may have improved performance characteristics (e.g. faster access time) over the primary data store used to store the backup data. Accordingly, such a cache 115 may be used to preemptively store data used for a restore, and thus, improve the overall data restore process.

The storage system 150, may include a storage appliance 152 in some embodiments. Accordingly, backup data may be communicated from the client 110 to the storage appliance 152 for initial processing, after which the processed backup data is uploaded from the storage appliance 152 for storage at the data protection environment 156. For example, a backup application may cooperate with a backup client application of the client 110 to back up client data to the data protection environment 156. A backup application may also cooperate with a backup client application to restore backed up data from the data protection environment 156 to the client 110. The storage appliance 152 may provide a variety of useful functionalities such as caching data, source-side data deduplication, data compression, and WAN optimization boost performance and throughput while also possibly reducing the consumption and cost of network bandwidth and cloud storage capacity. One, some, or all, of these functions of the storage appliance 152 can be performed using deduplication logic via deduplication module 155. For example, the deduplication module 155 can provide data segmentation, as well as in-flight encryption as the data is sent by the storage appliance 152 to the data protection environment 156.

In one embodiment, the storage system 150 (or storage appliance 152) may include a prediction engine 153 (or subsystem). In general, the prediction engine 153 may include machine learning components to process various statistical data related to accessing data such as the number of sequential versus non-sequential data reads. In addition, the prediction engine may perform various processing related to determining binomial probabilities and related calculations using a Binomial Probability Density Function (PDF) and/or an associated Cumulative Distribution Function (CDF) as further described herein.

The data protection environment 156 may include one or more instances of a filesystem 131 that catalogues files and other data residing in the data protection environment 156. In general, the storage of data 161 may be configured to store client data backups that can be restored in the event of a loss of data. The term data backups is intended to be construed broadly and includes, but is not limited to, partial backups, incremental backups, full backups, clones, snapshots, any other type of copies of data, and any combination of the foregoing. Any of the foregoing may, or may not, be deduplicated. The storage of data can employ any suitable storage technique, infrastructure, hardware (e.g. Solid State Drive (SSD), Hard Disk Drive (HDD)), or on virtual storage systems provided by a cloud service provider etc.

Data Restore Mechanism Implementing a Binomial Probability Distribution

As described, in some embodiments, a system may implement a more intelligent mechanism for managing caching data as part of a data restore process. In some embodiments, the system may utilize a read-ahead cache that leverages a statistical probability. For example, a data restore pattern may be modelled using a binomial probability distribution to dynamically enable when data is stored to a read-ahead cache. In one embodiment, the mechanism may enable/disable a read-ahead cache setting at any point during the restore process by dynamically adjusting a sequential read threshold according to a determined statistical probability. For example, such a dynamical setting may be determined based on a Binomial Probability Density Function (PDF) and/or an associated Cumulative Distribution Function (CDF) to calculate real-time thresholds.

By way of background, probability distributions may be utilized to calculate confidence intervals for parameters and to calculate critical regions for hypothesis tests. For example, a probability distribution may be used to determine a reasonable distributional model for the data. Statistical intervals and hypothesis tests are often based on specific distributional assumptions. Before computing an interval or test based on a distributional assumption, a set of assumptions may be determined to be valid for a given data set. It should be noted that a distribution does not necessarily need to be the best-fitting distribution for the data, but an adequate enough model so that the statistical technique yields useful results. Such models may include associated functions. For example, a discrete probability function is a function using a discrete number of values (e.g. not necessarily finite), which may include non-negative integers or a subset of non-negative integers. It should be noted that there is no mathematical restriction that discrete probability functions only be defined at integers, but for practical purposes, integers are most often used. For example, if a coin is flipped 6 times, the results may include 2 heads or 3 heads but not 2½ heads. Accordingly, each of the discrete values has a certain probability of occurrence that is between zero and one. For example, a discrete function that allows negative values or values greater than one is not a probability function. Thus, the condition that the probabilities sum to 1 means that at least one of the values has to occur.

Accordingly, given the properties of a probability function as described above, a restore mechanism of some embodiments of the disclosure may perform a data management process based on a statistical probability. More specifically, in some embodiments, a restore mechanism may consider the reading of data during a restore process as a binomial random variable, and accordingly, a data restore process may be modeled as a binomial probability distribution. Before providing further details of the mechanism, a definition of various terms may be beneficial.

Initially, a binomial experiment is described. A binomial experiment may include an experiment that has various properties. A first property may include that the experiment has n repeated trials. For example, within a context of a restore process, a data restore may include n repeated reads of data. A second property may include each trial resulting in one of two possible outcomes. The two possible outcomes may include a success (or true) and failure (or false). For example, in the context of a data restore, a data read at a given offset may be either sequential (e.g. true) or non-sequential or random (e.g. false). A third property may include that the probability of success, denoted by P, is the same for every trial. For example, a probability of requiring a sequential read is the same for a data read at any offset (e.g. P=0.5). A forth property may include each trial being independent. In other words, the outcome of one trial does not affect the outcome of another or subsequent trial. For example, a data read at a second offset being sequential or non-sequential is independent of a data read at a first offset being sequential.

Next, a statistical data access experiment may demonstrate such properties. For example, the experiment may include reading data 100 times during a data restore process (or historical data restore process) and counting the number of times a data read is sequential. Such an experiment is a binomial experiment for the following reasons. First, the experiment includes a set of repeated trials, which is the reading of data 100 times. Second, each trial (e.g. data read) may be presumed to result in just one of two possible outcomes, which are a sequential data read and a non-sequential data read. Third, the probability of a sequential data read is presumed to be constant (e.g. 0.5 or 50% for each trial/data read). Fourth, and finally, each trial is independent, which means the mechanism may presume that a data read that is sequential (or non-sequential) does not affect whether a subsequent (e.g. next) data read is sequential or non-sequential.

Accordingly, within the context of a restore mechanism, the binomial probability may use the following notation:

x: The number of sequential data reads that result from the binomial experiment.
n: The number of total data reads in the binomial experiment.
P: The probability of requiring a sequential data read for the next read offset.
Q: The probability of requiring a non-sequential data read for the next read offset (or 1–P.).
b(x; n, P): The binomial probability, which may equate to the probability that an n-read binomial experiment results in exactly x sequential data reads, when the probability of a sequential data read for next read offset is P.
$\binom{n}{x}$: The number of combinations of n reads, taken x at a time.

Given the above notations, a binomial distribution utilized by the restore mechanism according to some embodiments is described. A binomial random variable may include the number of successes x in n repeated trials of a binomial experiment. The probability distribution of a binomial random variable is called a binomial distribution. Accordingly, the restore mechanism may consider a data read at any offset in a restore pattern as a binomial random variable.

Next, a binomial probability utilized by the restore mechanism according to some embodiments is described. A binomial probability may refer to the probability that a binomial experiment results in exactly x successes. For example, a data read at any offset can be either sequential or non-sequential during a restore, and accordingly, a binomial probability of getting a sequential read may, for example, be 0.50 (or 50%), although any probability may be used. In other words, using a probability of 50%, the mechanism may consider the binomial probability of requiring a sequential read as being substantially equal to the probability of requiring a non-sequential data read.

Thus, given x, n, and P, the restore mechanism (e.g. system) may compute the binomial probability based on the binomial formula:

$$b(x;n,P) = \binom{n}{x} P^x (1-P)^{n-x} \qquad (1)$$

Accordingly, the above equation (i.e. equation (1)) may be considered the Probability Density Function (PDF) for a binomial probability distribution.

Finally, a cumulative binomial probability utilized by the restore mechanism according to some embodiments is described. A cumulative binomial probability may refer to the probability that the binomial random variable falls within a specified range (e.g. is greater than or equal to a stated lower limit and less than or equal to a stated upper limit).

Thus, the restore mechanism may compute a cumulative probability based on the binomial cumulative probability formula:

$$b(X \leq x; n, P) = \sum_{x=0}^{n} \binom{n}{x} P^x (1-P)^{n-x} \qquad (2)$$

Accordingly, the above equation (i.e. equation (2)) may be considered the Cumulative Distribution Function (CDF) for a binomial probability distribution.

As described above, it can be shown that a data restore process may be modeled based on a binomial distribution. For example, by applying a PDF formula, the restore mechanism may calculate the probability of a particular data read to be sequential or non-sequential at a particular offset (e.g. block address). In addition, restore mechanism may apply a CDF formula to consider historical data reads to determine the probability of a particular data read being sequential or non-sequential within a specified range (e.g. greater than or equal to a stated lower limit and less than or equal to a stated upper limit). The following examples further illustrate a restore mechanism using a binomial probability to adjust a restore parameter such as a read-ahead cache.

As a first example, the system may consider 100 historical reads (n=100). As described, a data read at any particular offset may be sequential or non-sequential. For example, a probability of requiring a sequential read at each offset may be 0.5 (e.g. P=0.5). If 90 of the 100 data reads were sequential, the system may determine the probability of the next read (e.g. read 101) being sequential. Accordingly, the system may calculate the individual probabilities of the 90 sequential historical reads, using the binomial formula as described above, and the sum of all these probabilities may be determined by the system.

Accordingly, the binomial formula (e.g. CDF) may be expressed as b(x<90; 100, 0.5)=b(x=0; 100, 0.5)+b(x=1; 100, 0.5)+ . . . +b(x=90; 100, 0.5), which computes to b(x<90; 100, 0.5)=>0.9999. Using such a result, there is approximately a 99.99% chance that the next read will be sequential. Based on this probability, the sequential data read threshold may be set relatively high. In addition, a non-sequential data read threshold may be lowered.

As a second example, if 58 of the 100 data reads were sequential, the system may determine the probability of the next read (e.g. read 101) being sequential.

Accordingly, the binomial formula may be expressed as b(x<58; 100, 0.5)=b(x=0; 100, 0.5)+b(x=1; 100, 0.5)+ . . . +b(x=58; 100, 0.5), which computes to b(x<58; 100, 0.5) =0.95568. Using such a result, there is approximately a 95.568% chance that the next read will be sequential. Based on this probability, the sequential data read threshold may again be set relatively higher and the non-sequential data read threshold lowered.

As a third example, if 45 of the 100 data reads were sequential, the system may determine the probability of the next read (e.g. read 101) being sequential.

Accordingly, the binomial formula may be expressed as b(x<45; 100, 0.5)=b(x=0; 100, 0.5)+b(x=1; 100, 0.5)+ . . . +b(x=45; 100, 0.5), which computes to b(x<45; 100, 0.5) =0.1841. Using such a result, there is approximately an 18.41% chance that the next read will be sequential. Based on this probability, the sequential data read threshold may be set relatively low and the non-sequential data read threshold increased.

The shape of a binomial distribution using a PDF or CDF may vary depending on the probability of a sequential read as shown in FIGS. 2 and 3.

Figure 2A:
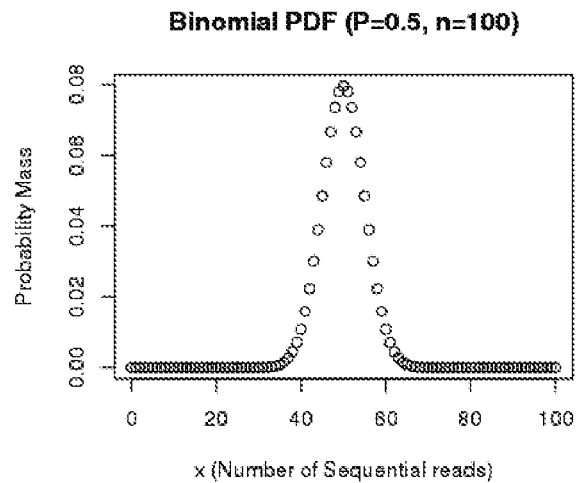
FIGS. 2A-2B are diagrams illustrating example charts of a binomial probability distribution of sequential reads given a first sequential read probability according to one or more embodiments of the disclosure.
Figure 2B:
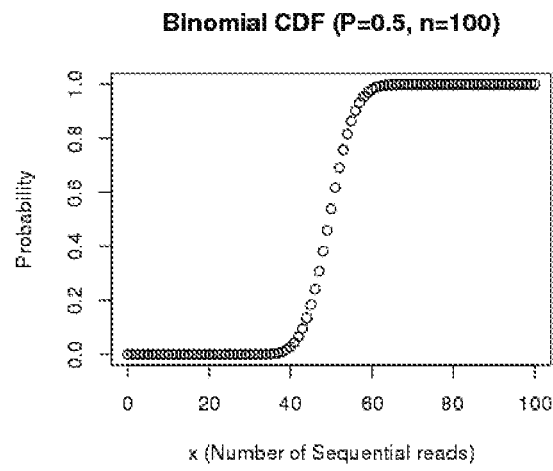

FIGS. 2A-2B are diagrams illustrating example charts of a binomial probability distribution of sequential reads given a first sequential read probability (e.g. sequential read probability of 50%) according to one or more embodiments of the disclosure. FIG. 2A illustrates the probability mass for a PDF of a number of sequential reads out of 100 total data reads. As shown, the probability mass is greatest in the range of 40 to 60 sequential reads out of 100 based on the probability of a sequential data read being 50%. FIG. 2B illustrates a CDF of a number of sequential reads out of 100 total data reads. As shown, the probability increases dramatically to 1 as the number of sequential reads approaches and exceeds 50 out of 100 based on the probability of a sequential data read being 50%.

Figure 3A:
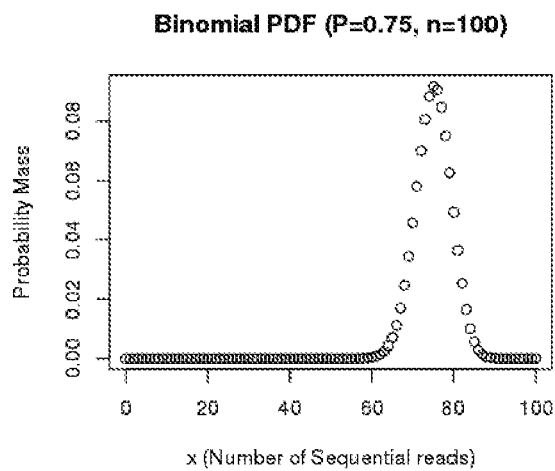
FIGS. 3A-3B are diagrams illustrating example charts of a binomial probability distribution of sequential reads given a second sequential read probability according to one or more embodiments of the disclosure.
Figure 3B:
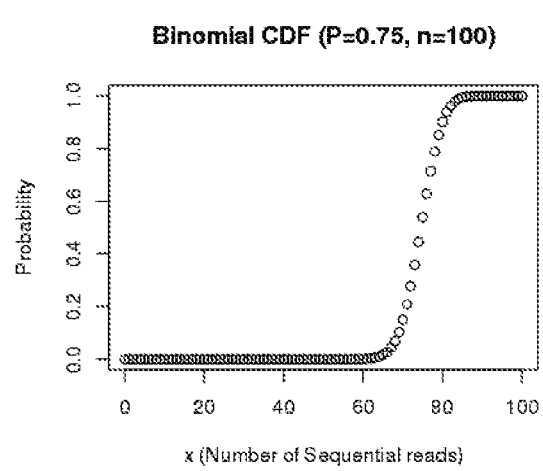

Similarly, FIGS. 3A-3B are diagrams illustrating example charts of a binomial probability distribution of sequential reads given a second sequential read probability (e.g. sequential read probability of 75%) according to one or more embodiments of the disclosure. FIG. 3A illustrates the probability mass for a PDF of a number of sequential reads out of 100 total data reads. As shown, the probability mass is greatest in the range of 65 to 85 sequential reads out of 100 based on the probability of a sequential data read being 75%. FIG. 3B illustrates a CDF of a number of sequential reads out of 100 total data reads. As shown, the probability increases dramatically to 1 as the number of sequential reads approaches and exceeds 75 out of 100 based on the probability of a sequential data read being 75%.

Returning back to the restore mechanism, in some embodiments, the binomial model may be used for predictive analysis such as part of a machine learning model. For example, if a system has observed that a data restore pattern has about 70% non-sequential reads and 30% sequential reads (e.g. probability of a sequential read being approximately 30% or P=0.3), the system may determine various probabilities for a given sample. For example, the system may determine the probability that in a given sample of 5 reads (e.g. n=5) during a data restore that at most 2 (x=2) reads are sequential.

Accordingly, the binomial formula (e.g. CDF) may be expressed as b(x<2; 5, 0.3)=b(x=0; 5, 0.3)+b(x=1; 5, 0.3)+ b(x=2; 5, 0.3), which is b(x<2; 5, 0.3)=0.1681+0.3601+ 0.3087, which computes to b(x<2; 5, 0.3)=0.8369. Using such a result, there is approximately an 83.69 percentage chance of getting 2 sequential reads.

Accordingly, the predictive analysis of getting 2 sequential reads may then be used to optimize the caching of data during a data restore process. For example, after a first sequential data read, the system adjust the sequential data read threshold based on the probability of a next sequential data read being relatively high.

Accordingly, by using a binomial probability distribution model for restore patterns, the restore mechanism may implement intelligent and dynamic caching as part of a data restore process.

Methods of a Data Restore Mechanism Implementing a Binomial Probability Distribution As further described, the system may provide an intelligent mechanism that leverages a binomial probability distribution for managing caching of data. Accordingly, various methods and operations may be implemented by the system to provide such functionality as further described herein.

Figure 4:
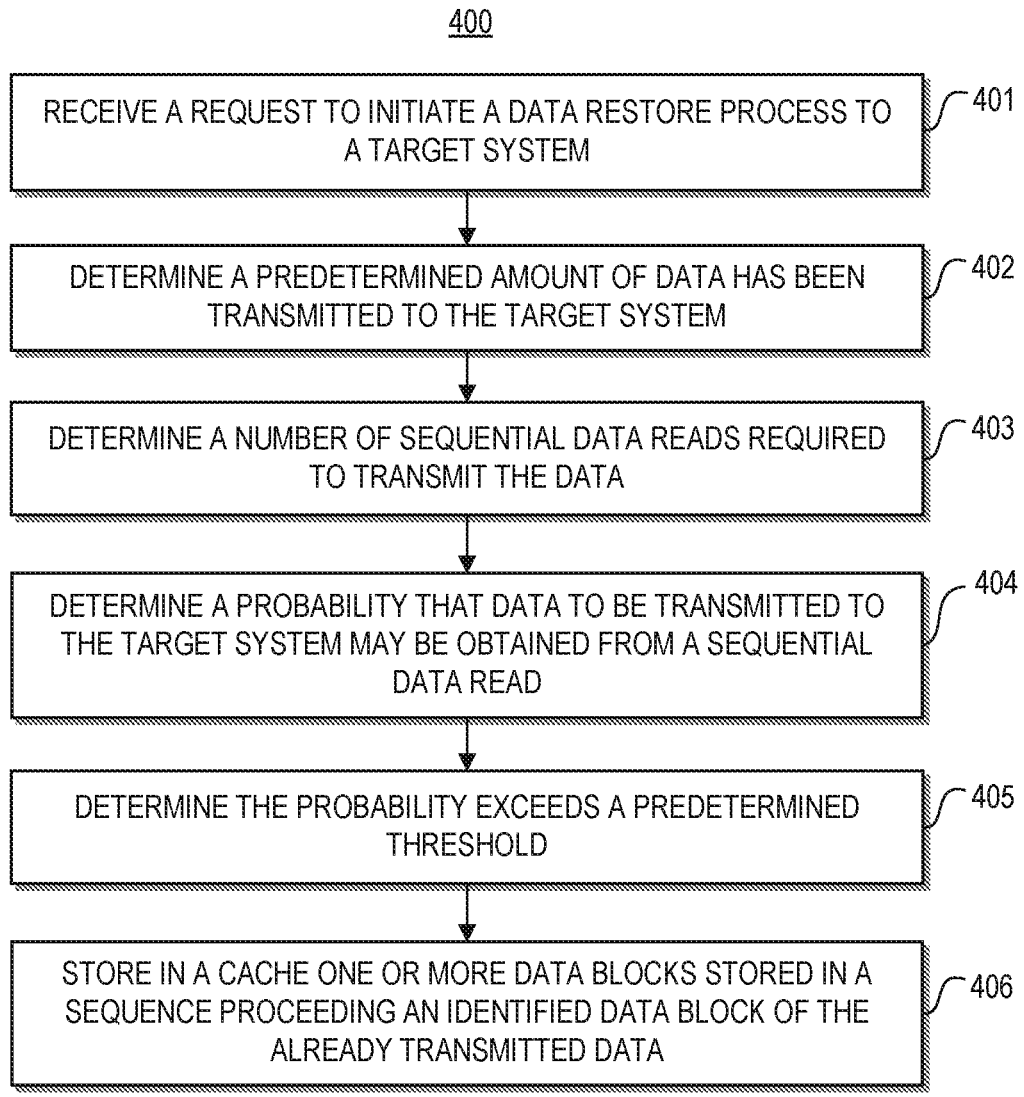
FIG. 4 is a flow diagram illustrating an example method of predicting sequential data reads during a data restore process according to one or more embodiments of the disclosure.

FIG. 4 is a flow diagram illustrating an example method of predicting sequential data reads during a data restore process according to one or more embodiments of the disclosure. Process 400 may use processing logic, which may include software, hardware, or a combination thereof. For example, process 400 may be performed by a system including one or more components described in operating environment 100 (e.g. storage system 150).

As described, in some embodiments, the system (e.g. storage system 150) may implement an efficient process for managing data caching as part of a data restore process. For example, the system may determine a binomial probability distribution to dynamically enable when data is stored to read-ahead cache.

In 401, the system (e.g. storage system 150) may receive a request to initiate a data restore process of backup data to a target system (e.g. client 110). The backup data (e.g. data 161) may be stored in sequential and non-sequential data blocks within a data store (e.g. within data protection environment 156) associated with the storage system. It should be noted that the term data blocks may also include various other units of data such as extents, segments, chunks, etc.

In 402, the system may determine a predetermined amount of data has been transmitted to the target system. In one embodiment, the system may determine a first portion of the backup data has been transmitted to the target system as part of the data restore process. For example, the predetermined amount of data (e.g. first portion of the data) may be set to 512 MB (e.g. after 16×32 KB reads). In some embodiments, the system may also determine if a predetermined amount of data has been read, or obtained from a data store. For example, the system may use a predetermined number of reads (e.g. 16 reads). Accordingly, the system may reevaluate or dynamically alter various settings such as a read-ahead cache setting each time a predetermined amount of data (e.g. 512 MB) has been transmitted, read, or obtained as part of the data restore process.

In 403, the system may determine a number of sequential data reads from a total number of data reads required to transmit the data. As described, in order to transmit data to the target system, the system may read (or obtain) the backup data stored in the data store. Accordingly, in one embodiment, the system may determine a number of sequential data reads from a total number of data reads required to obtain the first portion of the data. As described, portions of the backup data may be stored sequentially within the data store, and accordingly, may be obtained from a sequential data read. Similarly, portions of the backup data may also be stored non-sequentially (or randomly), and accordingly, may be obtained from a non-sequential data read. Accordingly, the determined number of sequential data reads for the first portion of the data may correspond to n as described above in the binomial experiment, and the total number of data reads required to obtain the first portion of the data may correspond to x in the binomial experiment.

In 404, the system may determine a probability that data yet to be transmitted to the target system may be obtained by performing a sequential data read. Accordingly, in one embodiment, the system may determine a probability that a second portion of the data to be transmitted subsequent to the first portion of data may be obtained by performing one or more sequential data reads. As described, the probability may be based on the determined number of sequential data reads required to obtain the first portion of the data. As described, in some embodiments, the system may determine a binomial probability distribution of sequential data reads versus non-sequential data reads to obtain the first portion of the data. For example, the determined binomial probability distribution may be based on: 1) an x number of total data reads to obtain the first portion of the data; 2) an n number of sequential data reads to obtain the first portion of the data; and 3) a probability P for performing sequential data reads being substantially equal to performing non-sequential data reads. For example, probably P for performing sequential data read being substantially equal to performing non-sequential data reads be equate to approximately 50% or 0.5. It should be noted, however, that the probability may be customized based on a particular system.

Accordingly, in one embodiment, the system may determine the probability that the second portion of the data may be obtained by performing one or more sequential data reads based on a probability density function (PDF). For instance, as described in the examples discussed above, given x, n, and P, the system may compute the binomial probability based on the binomial formula:

$$b(x;n,P) = \binom{n}{x} P^x (1-P)^{n-x} \quad (1)$$

In addition, a probability may be based on a cumulative calculation. Accordingly, in one embodiment, the system may determine that the probability that the second portion of the data may be obtained by performing one or more sequential data reads based on a cumulative distribution function (CDF). For instance, as described in the examples discussed above, the system may compute a cumulative probability based on the binomial cumulative probability formula:

$$b(X \leq x; n, P) = \sum_{x=0}^{n} \binom{n}{x} P^x (1-P)^{n-x} \quad (2)$$

In 405, the system may determine whether the determined probability exceeds a threshold value. Accordingly, in one embodiment, the system may determine whether the probability that a second portion of the data to be transmitted subsequent to the first portion of data may be obtained by performing one or more sequential data reads exceeds the threshold. In one embodiment, if the binomial probability exceeds the threshold value (e.g. a predetermined percentage), the system may adjust one or more data restore parameters. For example, the data restore parameter may include a setting to enable or disable a read-ahead cache. In one embodiment, the system may enable a read-ahead cache setting if the determined the probability exceeds the threshold value and disable the read-ahead cache setting if the determined the probability is below a predetermined value. For example, if the probability of a sequential data read is determined to be low (or drops below the predetermined value), caching may be disabled until it is determined that the probability reaches (or exceeds) a threshold value.

In addition, in some embodiments, based on the determined binomial probability (e.g. PDF or CDF), the system may adjust a sequential or non-sequential data read percentage threshold. In one embodiment, the system may determine a sequential data read threshold as the threshold value based on the determined probability, and then determine whether a predetermined number of the sequential data reads of the total data reads satisfy the sequential data read threshold. For example, if the binomial probability is determined to be high (e.g. high likelihood that one or more subsequent data reads will be sequential), as described in the examples above, the system may increase a sequential data read threshold (e.g. percentage, or ratio, or value). Accordingly, if the sequential data read threshold is set to 80%, the system may determine that after 80% of a certain number of sequential data reads (e.g. more than eight of the last 10) a read-ahead cache is to be enabled.

As described, the system may use results of a binomial probability calculation to improve and an Access Pattern Detection (APD) algorithm that may implement various thresholds. For example, an APD algorithm may divide a file into multiple regions and detect access pattern within those files as either sequential or non-sequential. Region sizes may be fixed or dynamically set based on jumps in offsets. Amongst other optimizations, the system may enable/disable read-ahead caching depending on the access pattern detected by the APD algorithm.

In addition, the system may use results of a binomial probability calculation for predictive analysis. For example, the system may determine the probability that a certain number of a total reads will be sequential based on a CDF calculation as described above. In one embodiment, the system may store data (e.g. as a data set) related to a binomial probability distribution of sequential data reads versus non-sequential data reads required to obtain data. The system may then train a machine learning model using the data set. For example, the machine learning model may be used to determine various restore parameters (e.g. threshold values) used for implementing a read-ahead cache.

Returning to process 400, in 406, in response to determining the probability exceeds a threshold value, the system may store in a cache one or more data blocks of a sequence of data blocks proceeding an identified data block of the first portion of data. As described, the cache may be a read-ahead cache, and accordingly, the one or more data blocks may be stored in the cache prior to determining whether the one or more data blocks are required as part of the data restore process for the second portion of the data. For example, to improve efficiency, the system may anticipate or predict a sequence of data blocks proceeding one or more data blocks of the first portion of the data being required as part of the data restore process. For example, the sequence of data blocks proceeding an identified data block may include data blocks that are located immediately adjacent to, or within a next set or sequence of block addresses, of the identified data block address. In one embodiment, because the last data read of the first portion of data may include a random (e.g. non-sequential) read, the identified data block of the first portion of data may comprise a data block included in a last sequential data read. Accordingly, the system may pick up where it last left off with respect to sequential data reads.

As described above, the system may utilize a read-ahead cache setting. Accordingly, in one embodiment, the system may dynamically enable a read-ahead cache setting and store (e.g. preemptively) one or more data segments in the cache when the read-ahead cache setting is enabled.

After the system has stored data within the cache, which may include a local cache on the target system, the system may then initiate transfer of that data as part of the data restore process. For example, the system may initiate transmitting the one or more data blocks stored in the cache to a data store associated with the target system after determining the one or more data blocks are required as part of the data restore process for the second portion of the data.

Accordingly, as described above, in some embodiments, the system may leverage a binomial probability model to improve the efficiency of a data restore process.

Example Computing System

Figure 5:
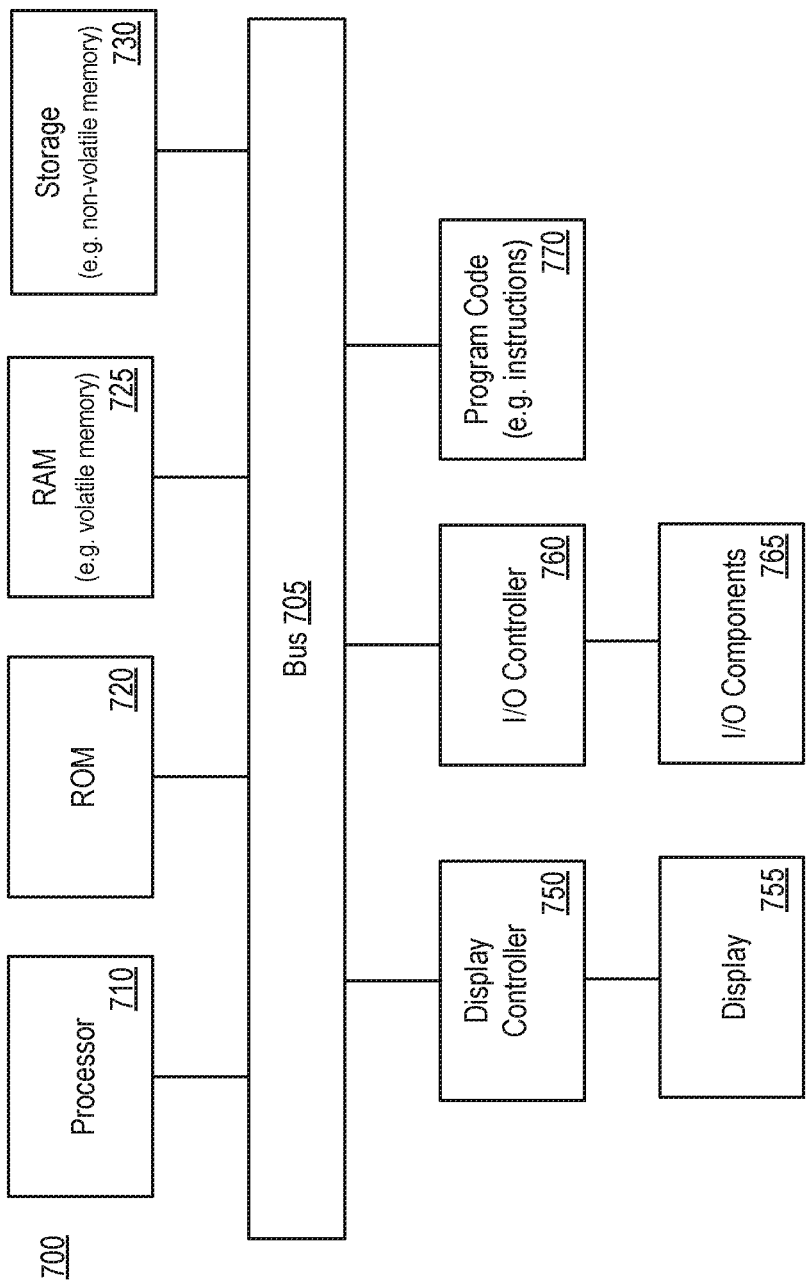
FIG. 5 is a block diagram illustrating an example of a computing system that may be used in conjunction with one or more embodiments of the disclosure.

FIG. 5 shows a block diagram of an example of a computing system that may be used in conjunction with one or more embodiments. For example, computing system 700 (or system, or server, or computing device, or device) may represent any of the devices or systems (e.g. storage system 150, or client 110, etc.) described herein that perform any of the processes, operations, or methods of the disclosure. Note that while the computing system 700 illustrates various components, it is not intended to represent any particular architecture or manner of interconnecting the components as such details are not germane to the present disclosure. It will also be appreciated that other types of systems that have fewer or more components than shown may also be used with the present disclosure.

As shown, the computing system 700 may include a bus 705 which may be coupled to a processor 710, ROM (Read Only Memory) 720, RAM (or volatile memory) 725, and storage (or non-volatile memory) 730. The processor 710 may retrieve stored instructions from one or more of the memories 720, 725, and 730 and execute the instructions to perform processes, operations, or methods described herein. These memories represent examples of a non-transitory computer-readable medium (or machine-readable medium, a computer program product, etc.) containing instructions (or program code) which when executed by a processor (or system, device, etc.), cause the processor to perform operations, processes, or methods described herein. The RAM 725 may be implemented as, for example, dynamic RAM (DRAM), or other types of memory that require power continually in order to refresh or maintain the data in the memory. Storage 730 may include, for example, magnetic, semiconductor, tape, optical, removable, non-removable, and other types of storage that maintain data even after power is removed from the system. It should be appreciated that storage 730 may be remote from the system (e.g. accessible via a network).

A display controller 750 may be coupled to the bus 705 in order to receive display data to be displayed on a display device 755, which can display any one of the user interface features or embodiments described herein and may be a local or a remote display device. The computing system 700 may also include one or more input/output (I/O) components 765 including mice, keyboards, touch screen, network interfaces, printers, speakers, and other devices. Typically, the input/output components 765 are coupled to the system through an input/output controller 760.

Program code 770 may represent any of the instructions, applications, software, libraries, toolkits, modules, components, engines, units, functions, logic, etc. as described herein. Program code 770 may reside, completely or at least partially, within the memories described herein (e.g. non-transitory computer-readable media), or within a processor during execution thereof by the computing system. Program code 770 may include both machine code, such as produced by a compiler, and files containing higher-level or intermediate code that may be executed by a computing system or other data processing apparatus (or machine) using an interpreter. In addition, program code 770 can be implemented as software, firmware, or functional circuitry within the computing system, or as combinations thereof. Program code 770 may also be downloaded, in whole or in part, through the use of a software development kit or toolkit that enables the creation and implementation of the described embodiments.

Moreover, any of the disclosed embodiments may be embodied in various types of hardware, software, firmware, and combinations thereof. For example, some techniques disclosed herein may be implemented, at least in part, by non-transitory computer-readable media that include program instructions, state information, etc., for performing various methods and operations described herein.

It should be noted that the term "approximately" or "substantially" may be used herein and may be interpreted as "as nearly as practicable," "within technical limitations," and the like. In addition, the use of the term "or" indicates an inclusive or (e.g., and/or) unless otherwise specified.

Other embodiments of the disclosure will be apparent to those skilled in the art from consideration of the specification and practice of the invention disclosed herein. It is intended that the specification and examples be considered as examples only, with a true scope and spirit of the embodiments being indicated by the claims.

What is claimed is:

1. A storage system comprising:
   one or more processors; and
   a non-transitory computer readable medium storing a plurality of instructions, which when executed, cause the one or more processors to:
   receive a request to initiate a data restore process of backup data to a target system, the data stored in sequential and non-sequential data blocks within a data store associated with the storage system;
   determine a number of sequential data reads from a total number of data reads required to obtain the first portion of the data in response to determining a first portion of the data has been transmitted to the target system as part of the data restore process;
   determine a probability that a second portion of the data to be transmitted subsequent to the first portion of data may be obtained by performing one or more sequential data reads, the probability based on the determined number of sequential data reads required to obtain the first portion of the data; and store in a cache, in response to determining the probability exceeds a threshold value, one or more data blocks of a sequence of data blocks proceeding an identified data block of the first portion of data, the one or more data blocks stored in the cache prior to determining whether the one or more data blocks are required as part of the data restore process for the second portion of the data.

2. The system of claim 1, wherein the identified data block of the first portion of data comprises a data block included in a last sequential data read.

3. The system of claim 1, wherein determining the probability that the second portion of the data may be obtained by performing one or more sequential data reads includes:
determining a binomial probability distribution of sequential data reads versus non-sequential data reads to obtain the first portion of the data.

4. The system of claim 3, wherein the determined binomial probability distribution is based on:
an x number of total data reads to obtain the first portion of the data;
an n number of sequential data reads to obtain the first portion of the data; and
a probability P for performing sequential data reads being substantially equal to performing non-sequential data reads.

5. The system of claim 4, wherein the probability that the second portion of the data may be obtained by performing one or more sequential data reads is based on a probability density function (PDF).

6. The system of claim 4, wherein the probability that the second portion of the data may be obtained by performing one or more sequential data reads is based on a cumulative distribution function (CDF).

7. The system of claim 3, wherein the plurality of instructions, when executed, further cause the one or more processors to:
store, as a first data set, the determined binomial probability distribution of sequential data reads versus non-sequential data reads to obtain the first portion of the data; and
train, using the stored first data set, a machine learning model used to determine the threshold value for a subsequent data restore process.

8. The system of claim 1, wherein the plurality of instructions, when executed, further cause the one or more processors to:
determine a sequential data read threshold as the threshold value based on the determined probability; and
determine that a predetermined number of the sequential data reads of the total data reads satisfy the sequential data read threshold.

9. The system of claim 1, wherein the plurality of instructions, when executed, further cause the one or more processors to:
disable a read-ahead cache setting if the determined the probability is below a predetermined value; and
enable the read-ahead cache setting if the determined the probability exceeds the threshold value, wherein the one or more data blocks are stored in the cache when the read-ahead cache setting is enabled.

10. The system of claim 1, wherein the plurality of instructions, when executed, further cause the one or more processors to:
initiate transmitting the one or more data blocks stored in the cache to a data store associated with the target system after determining the one or more data blocks are required as part of the data restore process for the second portion of the data.

11. A computer program product comprising computer-readable program code to be executed by one or more processors when retrieved from a non-transitory computer-readable medium, the program code including instructions to:
receive a request to initiate a data restore process of backup data to a target system, the data stored in sequential and non-sequential data blocks within a data store associated with the storage system;
determine a number of sequential data reads from a total number of data reads required to obtain the first portion of the data in response to determining a first portion of the data has been transmitted to the target system as part of the data restore process;
determine a probability that a second portion of the data to be transmitted subsequent to the first portion of data may be obtained by performing one or more sequential data reads, the probability based on the determined number of sequential data reads required to obtain the first portion of the data; and
store in a cache, in response to determining the probability exceeds a threshold value, one or more data blocks of a sequence of data blocks proceeding an identified data block of the first portion of data, the one or more data blocks stored in the cache prior to determining whether the one or more data blocks are required as part of the data restore process for the second portion of the data.

12. The computer program product of claim 11, wherein the identified data block of the first portion of data comprises a data block included in a last sequential data read.

13. The computer program product of claim 11, wherein determining the probability that the second portion of the data may be obtained by performing one or more sequential data reads includes:
determining a binomial probability distribution of sequential data reads versus non-sequential data reads to obtain the first portion of the data.

14. The computer program product of claim 13, wherein the determined binomial probability distribution is based on:
an x number of total data reads to obtain the first portion of the data;
an n number of sequential data reads to obtain the first portion of the data; and
a probability P for performing sequential data reads being substantially equal to performing non-sequential data reads.

15. The computer program product of claim 14, wherein the probability that the second portion of the data may be obtained by performing one or more sequential data reads is based on a probability density function (PDF).

16. The computer program product of claim 14, wherein the probability that the second portion of the data may be obtained by performing one or more sequential data reads is based on a cumulative distribution function (CDF).

17. The computer program product of claim 13, wherein the program code includes further instructions, when executed, further cause the one or more processors to:
store, as a first data set, the determined binomial probability distribution of sequential data reads versus non-sequential data reads to obtain the first portion of the data; and
train, using the stored first data set, a machine learning model used to determine the threshold value for a subsequent data restore process.

18. A method comprising:
receiving a request to initiate a data restore process of backup data to a target system, the data stored in sequential and non-sequential data blocks within a data store associated with the storage system;
determining a number of sequential data reads from a total number of data reads required to obtain the first portion of the data in response to determining a first portion of the data has been transmitted to the target system as part of the data restore process;
determining a probability that a second portion of the data to be transmitted subsequent to the first portion of data may be obtained by performing one or more sequential data reads, the probability based on the determined number of sequential data reads required to obtain the first portion of the data; and
storing in a cache, in response to determining the probability exceeds a threshold value, one or more data blocks of a sequence of data blocks proceeding an identified data block of the first portion of data, the one or more data blocks stored in the cache prior to determining whether the one or more data blocks are required as part of the data restore process for the second portion of the data.

19. The method of claim 18, wherein determining the probability that the second portion of the data may be obtained by performing one or more sequential data reads includes:
determining a binomial probability distribution of sequential data reads versus non-sequential data reads to obtain the first portion of the data, the determined binomial probability distribution is based on:
an x number of total data reads to obtain the first portion of the data;
an n number of sequential data reads to obtain the first portion of the data; and
a probability P for performing sequential data reads being substantially equal to performing non-sequential data reads.

20. The method of claim 19, wherein the probability that the second portion of the data may be obtained by performing one or more sequential data reads is based on a cumulative distribution function (CDF).

21. The method of claim 19 further comprising:
storing, as a first data set, the determined binomial probability distribution of sequential data reads versus non-sequential data reads to obtain the first portion of the data; and
training, using the stored first data set, a machine learning model used to determine the threshold value for a subsequent data restore process.

22. The method of claim 18, wherein the probability that the second portion of the data may be obtained by performing one or more sequential data reads is based on a probability density function (PDF).

* * * * *